_United States Patent_ [19]

Fries

[11] Patent Number: 4,513,117
[45] Date of Patent: Apr. 23, 1985

[54] PROCESS FOR CONVERSION OF VINYL COPOLYMERS TO VINYLIC ALCOHOL COPOLYMERS BY HOMOGENEOUS REACTION WITH ORGANOMETALLIC COMPOUNDS

[75] Inventor: Richard W. Fries, Joliet, Ill.

[73] Assignee: Northern Petrochemical Company, Omaha, Nebr.

[21] Appl. No.: 607,709

[22] Filed: May 7, 1984

[51] Int. Cl.$^3$ .............................. C08F 8/12; C08F 8/36
[52] U.S. Cl. .......................................... 525/60; 525/62; 525/330.6; 525/364; 525/365; 525/539
[58] Field of Search ................ 525/60, 62, 330.6, 364, 525/365, 539

[56] References Cited

U.S. PATENT DOCUMENTS

| | | | |
|---|---|---|---|
| 2,495,255 | 1/1950 | Hoehn | 525/539 |
| 3,028,374 | 4/1962 | Ehmann et al. | 525/60 |
| 3,052,662 | 9/1962 | Shiraishi et al. | 525/60 |
| 3,143,542 | 8/1964 | Ziegler et al. | 260/239 |
| 3,172,876 | 3/1965 | Koch et al. | 525/60 |
| 4,224,262 | 9/1980 | Baird, Jr. et al. | 525/60 |

OTHER PUBLICATIONS

Condensed Chemical Dictionary, Tenth Edition, pp. 758 & 1085.
"Reductions with Dialkylaluminum Hydrides", Miller Biss and Schwartzman, _Journal of Organic Chemistry_, vol. 24, p. 627 (1959).

_Primary Examiner_—Joseph L. Schofer
_Assistant Examiner_—J. M. Reddick
_Attorney, Agent, or Firm_—Donald F. Haas

[57] ABSTRACT

A process as disclosed for producing vinylic alcohol copolymers by reacting vinyl ester or carbon monoxide copolymers with organometallic compounds in a homogeneous reaction medium.

6 Claims, No Drawings

PROCESS FOR CONVERSION OF VINYL COPOLYMERS TO VINYLIC ALCOHOL COPOLYMERS BY HOMOGENEOUS REACTION WITH ORGANOMETALLIC COMPOUNDS

BACKGROUND OF THE INVENTION

This invention relates to the production of vinylic alcohol copolymers and provides a new method for producing them from vinyl ester and carbon monoxide copolymers.

The commonly known method for the production of vinylic alcohol copolymers involves the hydrolysis of ethylene/vinyl acetate copolymers to give products in which a part or all of the acetate groups of the copolymers have been converted to hydroxy radicals. The hydrolysis or saponification is generally effected by the use of a catalyst for alcoholysis such as a strong base, mineral acid, or alkaline metal alcoholate in an alcohol such as methanol or ethanol.

It is known to use dialkyl aluminum hydrides and aluminum trialkyls to reduce organic compounds which contain multiple linkages between carbon and oxygen and/or carbon and nitrogen such as aldehydes, ketones, carboxylic acids, their hydrides and esters, lactones, acid amides, nitriles, lactams, and oximes. "Reductions with Dialkyl Aluminum Hydrides" by Miller, Biss and Schwartzman, *Journal of Organic Chemistry*, Vol. 24, page 627 (1959) discloses the reduction of benzoic acid to benzyl alcohol using dialkyl aluminum hydrides. U.S. Pat. No. 3,143,542, issued Aug. 1, 1964, discloses a process for the reduction of such organic compounds with organic aluminum compounds as does "Aluminium-trialkyle und Dialkyl-Aluminiumhydride Als Reduktionsmittel" by Ziegler, K. Schneider, and J. Schneider, *Justus Liebig's Ann. Chem.*, Vol 623, page 9 (1959).

SUMMARY OF INVENTION

This invention relates to a process for producing vinylic alcohol copolymers by reacing a vinyl ester or carbon monoxide copolymer with an organometallic compound in a homogeneous reaction medium.

DETAILED DESCRIPTION OF INVENTION

A variety of vinylic alcohol copolymers can be produced according to the present invention. Some examples (but not inclusive) for such copolymers are reduced copolymers of propylene, ethylene, and other alpha olefins and styrene with vinyl acetate, vinyl propionate, vinyl hexanoate, vinyl pivylate, etc. Carbon monoxide can be polymerized with ethylene, propylene, and styrene, among others.

The present invention is especially suitable for producing ethylene vinylic alcohol copolymers from ethylene vinyl acetate or ethylene carbon monoxide copolymers. Ethylene vinylic alcohol copolymers have a variety of uses including adhesives, paints, water soluble polymers and packaging. They are especially suitable for use in oxygen barrier films.

The reaction of the vinyl acetate copolymer and the organometallic compound generally takes place according to the following formula:

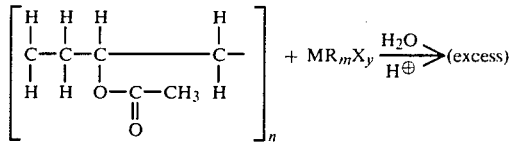

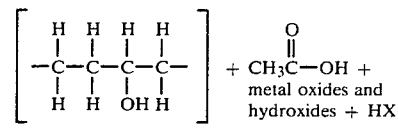

M is a metal such as aluminum, magnesium, zinc, tin, lead, etc; R is an alkyl group such as ethyl, methyl, benzyl, phenyl, etc. and/or hydrogen; X is a halogen such chlorine, bromine, etc. and/or hydrogen; m is between 4 and 0; and y is between 0 and 4.

The reaction between the ethylene carbon monoxide copolymer and the organometallic compound takes place according to the following formula:

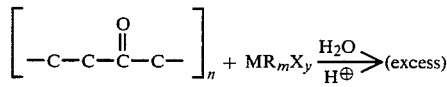

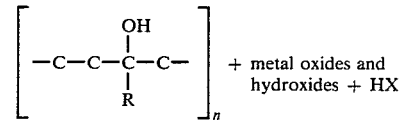

R on the polymer backbone can be an alkyl group or hydrogen and M, X, m, and y are as above.

A wide variety of organometallic compounds can be used to advantage in the present invention. The following is a list of organometallic compounds which includes some, but not all, of the compounds which can be used to produce vinyl alcohol copolymers according to the present invention: dicyclopentadienyl titanium dichloride, dialkyl magnesium compounds, diethyl aluminum chloride, triisobutyl aluminium, diisobutyl aluminum hydride, triethyl aluminum, ethyl aluminum dichloride, diethyl zinc and compounds of the formula $R_mMX_y$ where M is a metal, R is an alkyl group or hydrogen, X is a halogen, m is between 4 and 0, and y is between 0 and 4. Preferred organometallic compounds for use in the present invention are diethyl aluminum chloride, diisobutyl aluminum hydride and dialkyl magnesium compounds.

One of the primary advantages of the present invention is that the reaction of the vinyl ester or ethylene carbon monoxide copolymer and the organometallic compounds can take place in a homogeneous reaction medium. This medium generally consists of a solvent which is compatible with the catalyst, the vinyl ester or carbon monoxide copolymer, and the vinylic alcohol copolymer. The solvent should at least have the ability to dissolve both the catalyst and the vinyl ester or carbon monoxide copolymer. The following is a list which includes some, but not all, of the solvents which are useful in the present invention: xylenes, toluene, mesitylenes, tetrahydrofuranes, polyethers, etc. It is preferred that the reaction conditions be oxygen free and anhydrous before and during the addition of the organometallic compound because water and oxygen react with the organometallic compounds and decrease their activity. The temperature should not be higher than the boiling point of the solvent.

The process of the present invention is highly advantageous because of the relative ease of reaction. The reaction of the vinyl ester or carbon monoxide copolymers and the organometallic compounds takes place very quickly, in some cases almost instantaneously. A further advantage of this process is that the reaction to the vinylic alcohol copolymer takes place with a high degree of conversion, generally in the range of 90% and higher.

EXAMPLE 1

2.0 grams of ethylene carbon monoxide copolymer was taken up in 150 milliliters of xylene and the mixture heated to 90°–100° C. under nitrogen. To this was added 5 milliliters of 25% triisobutyl aluminum in heptane. The mixture was stirred for 1 hour and then 10 milliliters of diluted hydrochloric acid injected into the reaction medium. The xylene mixture was poured on 300 milliliters of cold methanol and the precipitate was filtered and dried. There was an almost complete recovery of polymer.

In the infrared spectrum, the carbonyl region at around 1700 $cm^{-1}$ was much less intense than authentic ethylene carbon monoxide copolymer. A new absorption at 3400 $cm^{-1}$ was formed which corresponds to hydroxyl groups as found in alcohols.

EXAMPLE 2

A similar reaction was carried out using 25% disobutyl aluminum hydride in heptane. The carbonyl peak at 1720 $cm^{-1}$ was nearly gone while a new intense peak at 3400 $cm^{-1}$ was formed in the infrared spectrum, indicating that an alcohol polymer was formed.

EXAMPLE 3

The steps in Example 1 were followed except that mixed diethyl magensium supplied by Ethyl Corporation was used instead of the isobutyl aluminum. In the infrared spectrum there was a very intense peak at 3400 $cm^{-1}$ and a new peak at 1630 $cm^{-1}$. The carbonyl peak at 1720 $cm^{-1}$, corresponding to ethylene carbon monoxide copolymer, was diminished.

EXAMPLE 4

The reaction was repeated using 25% diethyl aluminum chloride as the organometallic component. The infrared spectrum showed a broad peak at 3400 $cm^{-1}$ and essentially no absorption at 1720 $cm^{-1}$, corresponding to the starting material.

EXAMPLE 5

The reaction in Example 1 was repeated with a copolymer of 90% ethylene and 10% vinyl acetate. Diisobutyl aluminum hydride was used as the organometallic compound. The infrared spectrum showed a larger peak at 3400 $cm^{-1}$ and a peak at 1610 $cm^{-1}$. These were not present in the starting material. The carbonyl absorption at 1720–1730 $cm^{-1}$ was greatly reduced. This indicates the presence of hydroxyl groups as found in alcohols.

EXAMPLE 6

Example 5 was repeated using mixed dialkyl magnesium from Ethyl Corporation. There was only a small shoulder at 1720 $cm^{-1}$ and major peak at 1630 $cm^{-1}$ and 3400 $cm^{-1}$, corresponding to hydroxyl groups as is found in alcohols.

I claim:

1. A process for producing vinylic alcohol copolymers by reacting an organometallic compound wherein the metal is selected from the group consisting of titanium, magnesium, aluminum, and zinc with a copolymer selected from the group consisting of (a) copolymers of a vinyl ester and a comonomer selected from the group consisting of alpha olefins and styrene and (b) copolymers of carbon monoxide and a comonomer selected from the group consisting of alpha olefins and styrene.

2. The process of claim 1 wherein the reaction takes place in a homogeneous reaction medium.

3. The process of claim 2 wherein the organometallic compound is selected from the group consisting of $R_mMX_y$ where R can be an alkyl group or hydrogen, X is a halogen or hydrogen, M is a metal, m is between 4 and 0, and y is between 0 and 4.

4. The process of claim 2 wherein the temperature is not higher than the boiling point of the homogeneous reaction medium and the reaction takes place in an essentially anhydrous and oxygen-free atmosphere.

5. The process of claim 2 wherein the vinyl ester copolymer is a copolymer of ethylene and vinyl acetate.

6. The process of claim 2 wherein the carbon monoxide copolymer is a copolymer of ethylene and carbon monoxide.

* * * * *

REEXAMINATION CERTIFICATE (486th)
United States Patent [19]

Fries

[11] B1 4,513,117

[45] Certificate Issued Apr. 8, 1986

[54] PROCESS FOR CONVERSION OF VINYL COPOLYMERS TO VINYLIC ALCOHOL COPOLYMERS BY HOMOGENEOUS REACTION WITH ORGANOMETALLIC COMPOUNDS

[75] Inventor: Richard W. Fries, Joliet, Ill.

[73] Assignee: Northern Petrochemical Company, Omaha, Nebr.

Reexamination Request:
No. 90/000,855, Sep. 16, 1985

Reexamination Certificate for:
Patent No.: 4,513,117
Issued: Apr. 23, 1985

Appl. No.: 607,709
Filed: May 7, 1984

[51] Int. Cl.$^4$ .............................. C08F 8/12; C08F 8/36
[52] U.S. Cl. ........................................ 525/60; 525/62; 525/330.6; 525/364; 525/365; 525/539

[56] References Cited
FOREIGN PATENT DOCUMENTS
1436374  5/1976  United Kingdom .

Primary Examiner—Paul R. Michl

[57] ABSTRACT

A process as disclosed for producing vinylic alcohol copolymers by reacting vinyl ester or carbon monoxide copolymers with organometallic compounds in a homogeneous reaction medium.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1–6 are cancelled.

New claims 7–15 are added and determined to be patentable.

*7. A process for producing vinylic alcohol copolymers by reacting an organometallic compound wherein the metal is selected from the group consisting of titanium, magnesium, aluminum, and zinc with a copolymer which is selected from the group consisting of copolymers of a vinyl ester and a comonomer selected from the group consisting of alpha olefins and styrene.*

*8. The process of claim 7 wherein the reaction takes place in a homogeneous reaction medium.*

*9. The process of claim 8 wherein the organometallic compound is selected from the group consisting of $R_mMX_y$ where R can be an alkyl group or hydrogen, X is a halogen or hydrogen, M is a metal, m is between 4 and 0, and y is between 0 and 4.*

*10. The process of claim 8 wherein the temperature is not higher than the boiling point of the homogeneous reaction medium and the reaction takes place in an essentially anhydrous and oxygen-free atmosphere.*

*11. The process of claim 8 wherein the vinyl ester copolymer is a copolymer of ethylene and vinyl acetate.*

*12. A process for producing ethylene vinyl alcohol copolymers by reacting an organometallic compound wherein the metal is selected from the group consisting of titanium and aluminum with an ethylene carbon monoxide copolymer.*

*13. The process of claim 12 wherein the reaction takes place in a homogeneous reaction medium.*

*14. The process of claim 13 wherein the organometallic compound is selected from the group consisting of $R_mMX_y$ where R can be an alkyl group or hydrogen, X is a halogen or hydrogen, M is a metal, m is between 4 and 0, and y is between 0 and 4.*

*15. The process of claim 13 wherein the temperature is not higher than the boiling point of the homogeneous reaction medium and the reaction takes place in an essentially anhydrous and oxygen-free atmosphere.*

* * * * *